H. J. KINZEL.
COMBINED CUTTER AND CULTIVATOR.
APPLICATION FILED JULY 3, 1917.
1,244,746. Patented Oct. 30, 1917.
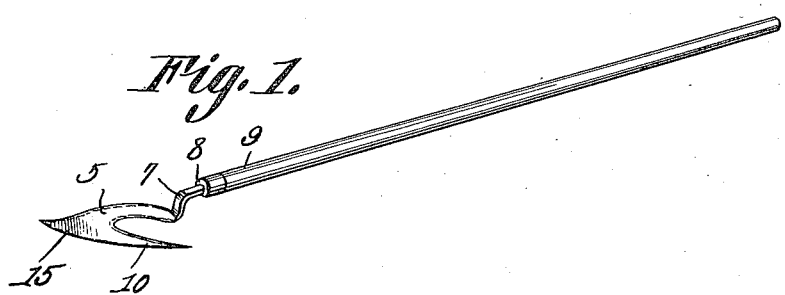
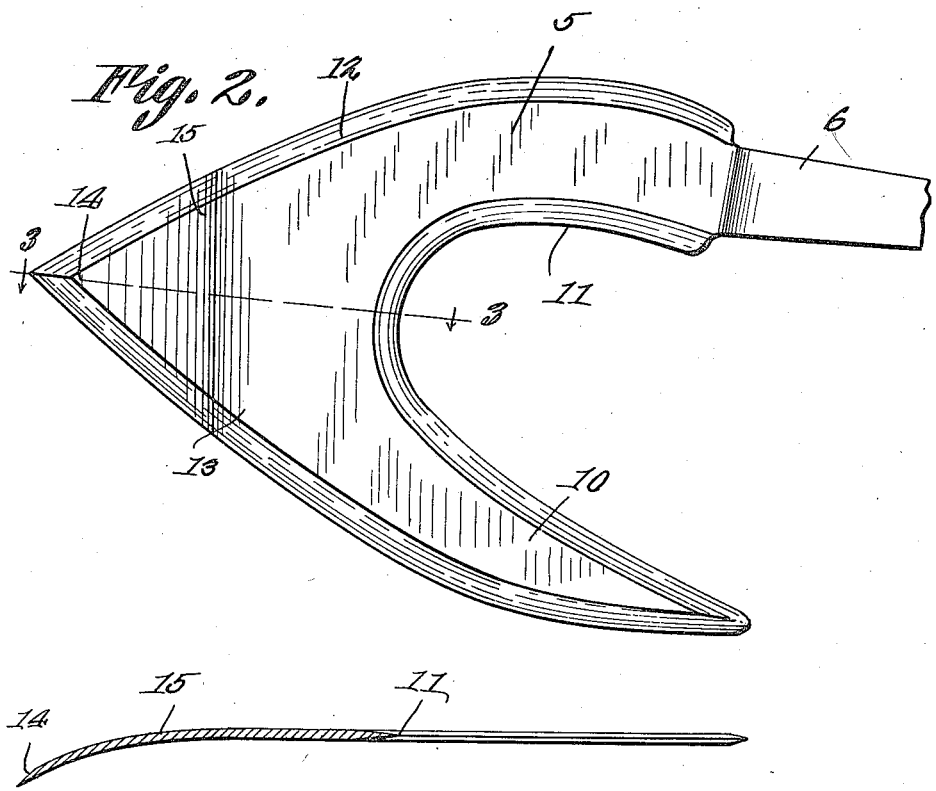

UNITED STATES PATENT OFFICE.

HENRY J. KINZEL, OF KNOXVILLE, TENNESSEE.

COMBINED CUTTER AND CULTIVATOR.

1,244,746. Specification of Letters Patent. Patented Oct. 30, 1917.

Application filed July 3, 1917. Serial No. 178,375.

*To all whom it may concern:*

Be it known that I, HENRY J. KINZEL, a citizen of the United States of America, and resident of Knoxville, in the county of Knox and State of Tennessee, have invented certain new and useful Improvements in Combined Cutters and Cultivators, of which the following is a specification.

This invention relates to brush and weed cutters and cultivating tool combined, the said invention having for its object the provision of a cutting device which can be operated for cutting in close proximity to the ground or for cutting objects which are in such proximity to other objects as will preclude the use of scythes or other tools requiring a swinging motion to make them effective.

A further object of this invention is to provide a cutting device which can be made effective when pulled or pushed and which can be operated without approaching very close to the object being cut. This is particularly desirable when operating on briers and is useful in trimming trees and in fact its utility covers a wide range.

A still further object of this invention is to provide a combined cutter and cultivator and by reason of the construction of the blade, it can operate as a shuffle hoe for the cultivation of soil.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in perspective showing the blade attached to a handle;

Fig. 2 illustrates an enlarged plan view of the blade; and

Fig. 3 illustrates a sectional view on the line 3—3 of Fig. 2.

In these drawings 5 denotes the blade having a shank 6 with an upturned shoulder 7 terminating in a spur 8 which enters the handle 9 so that the blade may be attached to the handle in any appropriate way, and the shoulder permits the operation of the blade on a plane slightly lower than the plane of the end of the handle and permits manipulation of the device on a plane parallel with the surface of the soil from which the growth is to be removed.

The blade has a hook or extension 10 and the blade and hook has a sharpened edge 11 which will engage an object to be cut. The outer edges 12 and 13 of the blade converge at the point 14 and the said edges are sharpened so that the implement may be thrust forward into engagement with an object to be cut, either one of the edges being employed in this connection.

By reason of the configuration of the blade, the forward end may be used as a cultivating tool and with this object in view, the blade is upwardly curved from approximately the point 15 intermediate the length of the blade. In cultivating soil, therefore, the handle may be elevated to a greater or less extent according to the depth to which the point of the blade shall penetrate and this will prove effective in cutting weeds or grass beneath the surface while at the same time disturb the soil and loosen it, an operation which will take the place of the usual hoeing operation, in the cultivating of crops.

In practice, the upturned shoulder has been found effective and preferably the shoulder stands at right angles to the blade although this angle may be varied within predetermined bounds and according to the angle the ditch or position of the blade with respect to the handle may be regulated.

I claim—

In a combined cutter and cultivator, a blade having its outer edges converging to a point, the inner edge of said blade being recessed to form a hook, said blade being curved intermediate its length whereby the point is in a plane differing from that of the blade, said blade and hook portion having a continuous cutting edge, a shank extending from the blade and having an upturned shoulder, and a handle to which the shank is attached.

HENRY J. KINZEL.